(12) United States Patent
Sanguinetti et al.

(10) Patent No.: US 10,056,974 B2
(45) Date of Patent: Aug. 21, 2018

(54) APPARATUS AND METHOD FOR LOW LATENCY, RECONFIGURABLE AND PICOSECOND RESOLUTION TIME CONTROLLER

(71) Applicant: ID QUANTIQUE SA, Carouge (CH)

(72) Inventors: Bruno Sanguinetti, Geneva (CH); Raphael Houlmann, Geneva (CH)

(73) Assignee: ID QUANTIQUE SA, Carouge (CH)

( * ) Notice: Subject to any disclaimer, the term of this patent is extended or adjusted under 35 U.S.C. 154(b) by 0 days.

(21) Appl. No.: 15/369,167

(22) Filed: Dec. 5, 2016

(65) Prior Publication Data

US 2017/0170893 A1 Jun. 15, 2017

(30) Foreign Application Priority Data

Dec. 9, 2015 (EP) .................................... 15003505

(51) Int. Cl.
*H04B 10/079* (2013.01)
*H04B 10/071* (2013.01)

(52) U.S. Cl.
CPC ......... *H04B 10/071* (2013.01); *H04B 10/079* (2013.01)

(58) Field of Classification Search
CPC ... G01T 1/2985; H04L 7/0331; H04L 7/0029; H04L 25/0262; H04B 10/071; H04B 10/079

(Continued)

(56) References Cited

U.S. PATENT DOCUMENTS 6,374,388 B1 4/2002 Hinch
6,456,959 B1 * 9/2002 Kattan ................... G04F 10/00
702/176

(Continued)

OTHER PUBLICATIONS

De Riedmatten H., Marcikic I., Tittel W., Zbinden H., and Gisin N., (2003). Quantum interference with photon pairs created in spatially separated sources, Phys. Rev. A 67, 022301.

(Continued)

*Primary Examiner* — Don N Vo
(74) *Attorney, Agent, or Firm* — Thomas Coester Intellectual Property (57) ABSTRACT

A reconfigurable and timely accurate method of generating, with a low latency, an output signal in response to multiple input signals, wherein said input signals occur at independent times, and wherein the occurrence of several input signals according to predetermined pattern is interpreted as a Super Event and wherein a detected Super Event triggers the production of a specific output signal heralding this Super Event, characterized in that said method comprises a first step of time acquisition of the occurrence of said input signals, a second step of adaptation of the acquisition data flow to the clock of the reconfigurable processing unit, a third step of determining the occurrence of a Super Event by comparing the events pattern to the super event definition, a fourth step identifying the Super Event and generating at least one event/signal corresponding to at least one trigger signal, a fifth step of adaptation of the generation data flow to the asynchronous generation device, a sixth step of applying a predefined delay for the issue of the at least one trigger signal, and an seventh step of outputting at least one output signal representing a trigger signal and sending it to a downstream unit.

10 Claims, 6 Drawing Sheets

(58) Field of Classification Search
USPC .......................................................... 398/25
See application file for complete search history.

(56) References Cited

U.S. PATENT DOCUMENTS

| | | | |
|---|---|---|---|
| 7,085,668 B2 * | 8/2006 | Johnson | G01R 31/31922 |
| | | | 702/117 |
| 7,624,294 B2 | 11/2009 | Conway | |
| 8,822,935 B2 | 9/2014 | Frach et al. | |
| 2009/0257319 A1 | 10/2009 | Henzler | |
| 2014/0047198 A1 * | 2/2014 | Stein | G01R 13/0254 |
| | | | 711/154 |
| 2015/0041625 A1 | 2/2015 | Dutton et al. | |

OTHER PUBLICATIONS

Marcikic I., De Riedmatten H., Tittel W., Zbinden H., Gisin N. (2003). Long distance quantum teleportation of qubits from photons at 1300 nm to photons at 1550 nm wavelength. Nature 421, 509-513.

Zhao Q., Xia L., Wan J., Jia, T. Gu, M., . . . Wu P. (2015). Long-haul and high-resolution optical time domain reflectometry using superconducting nanowire single-photon detectors. Scientific Reports, 5, 10441.

* cited by examiner

APPARATUS AND METHOD FOR LOW LATENCY, RECONFIGURABLE AND PICOSECOND RESOLUTION TIME CONTROLLER

TECHNICAL FIELD

The present invention relates generally to the field of instrumentation systems used for timely accurate reconfigurable logic operations and ways to adapt instrumentation devices to experiments requiring picoseconds range timing resolution.

BACKGROUND & PRIOR ART

In physical experiments, an Event "E" is often described as a digital signal edge transition from either a low level to a high level or high level to low level. For optical experiments such as Optical Time Domain Reflectometry (OTDR), optical quantum interference or Time Correlated Single Photon Counting (TCSPC), it is critical to precisely measure the occurrence of a super-event "SE" that can be defined as a combination of several "E" or the result of a logical operation between several "E" that might have been arbitrarily delayed. Generally speaking, an "E" may be considered as particle detection, for example, and an "SE" the result of the detection of a precise sequence of multiple particles with one or more detectors, for example. More precisely an example in photon counting-OTDR is disclosed in IEEE Journal of Lightwave Technology, Vol. 28, No. 6, 952-964, 2010, where laser trigger signals and detection signals are considered as events ("E"). The so-called OTDR trace showing backscattered optical intensity as a function of distance in an optical fiber network is obtained by measuring the time delay between the laser trigger signal and the detection signal. The graph shows the attenuation in the optical fiber and the discrete optical reflections that occur when two connectors are connected together or when the splice between two fiber strands is not good. Looking at this OTDR trace, a discrete reflection can be called a SE and is defined by a specific delay ($\tau$) between the acquisition of the laser trigger signal and the detection signal. A SE occurs each time a laser trigger signal is followed by a detection signal after a delay ($\tau$).

Usually, in Quantum Optics or physical experiments several types of solutions are used in a complementary way for precisely detecting an SE and generating a signal heralding the detection of this SE. These may be classified into three families: the first family is based on an apparatus able to detect an E with a high temporal accuracy (1), the second family is made with discrete electrical components (2) and finally the third family detects the SE with a unit process that can be programmed (3). For these three solution families, synchronous solutions have to be distinguished from asynchronous solutions. In a synchronous system, operations are coordinated under the centralized control of a fixed-rate clock signal or several clocks which enables to make logical operations. An asynchronous digital system, in contrast, has no global clock: instead, it operates under distributed control, with concurrent hardware components communicating and synchronizing on channels. Families (1) and (2) are based on asynchronous apparatus, whereas family (3) is a synchronous solution.

The first family of solutions uses highly accurate time measurement device that may be based on a Time to Digital Converter. A Time to Digital Converter (TDC) or Time Digitizer is a device for recognizing events and providing a digital representation of the time at which they occurred. Usually a TDC output is the time of arrival for each incoming pulse which is represented through timestamps, namely a file containing the time occurrence of each event with a defined resolution, which may be stored in a memory, disk drive or PC. The TDC is an asynchronous apparatus, so the time precision of such a device can be much higher than the internal clock of the computer to which the TDC is connected. TDCs are used in many different applications, where the time interval between two signal pulses (start and stop pulse) of an event should be determined. One of the classical TDC architectures is based on the coarse-fine architecture where the measurement is started and stopped, when either the rising or the falling edge of a signal pulse crosses a set threshold.

These requirements are fulfilled in many physical experiments, like time-of-flight and lifetime measurements in atomic and high energy physics (as disclosed in U.S. Pat. No. 8,822,935) where TDCs are used to provide timestamps of a detected radiation event. Additionally TDCs may be used in experiments that involve laser ranging and electronic research involving the testing of integrated circuits and high-speed data transfer. This is for example illustrated in the invention described in U.S. Pat. No. 7,624,294. Several products are currently commercialized as standalone TDCs such as Stanford Research systems SR400, Becker and Hickl TCSPC modules or ID800 provided by ID Quantique. These kinds of devices enable to provide accurate timing detection of events that can be used in set-ups such as the one described in (Zhao & al., 2015) for photon counting-OTDR experiments.

Figure 1A:
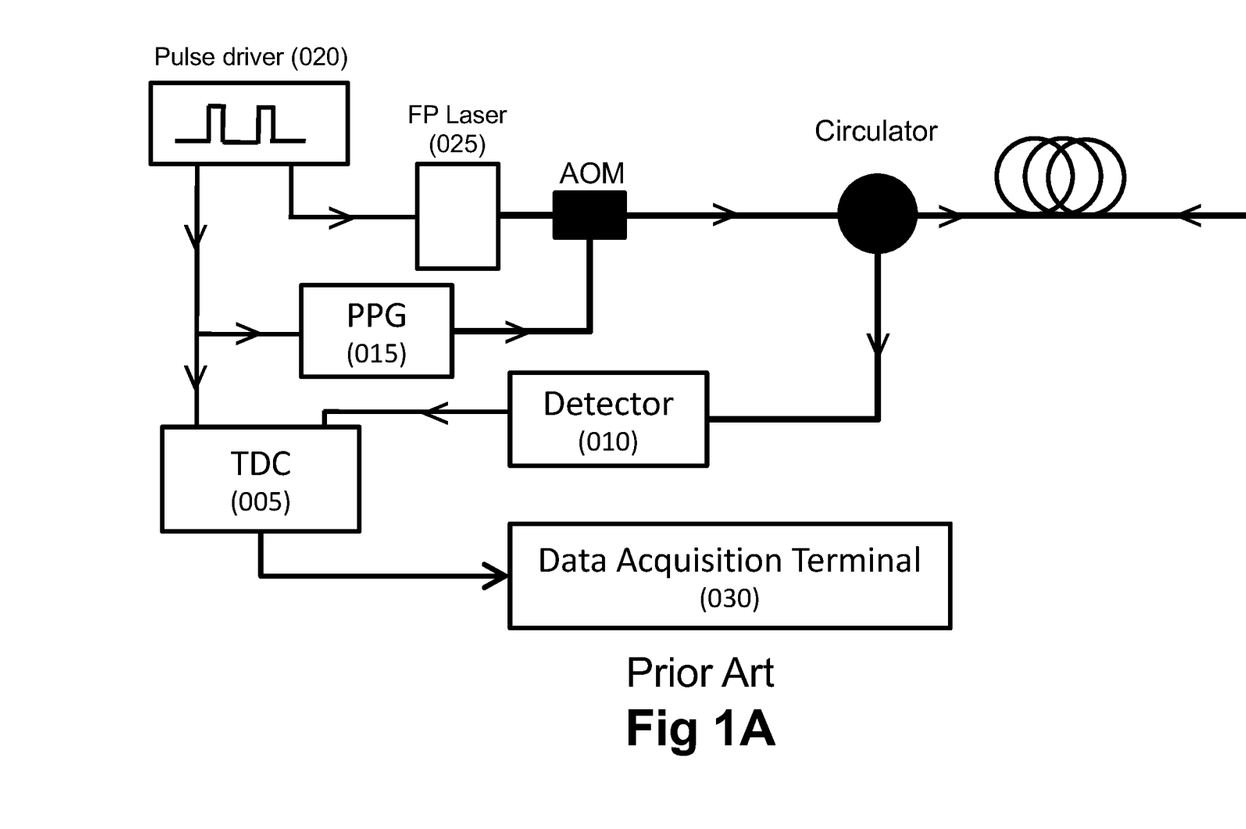
FIG. 1A is a schematic view of an example of prior art experimental set-up for an OTDR experiment.

An experimental set-up presented in the prior art is illustrated in FIG. 1a. In this example aiming at realizing photon counting-OTDR experiments, an FP laser diode 025 is internally modulated with a square pulse driver 020. This is done in order to obtain high dynamic range, pure optical pulses with high extinction ratio. In order to compensate the light leakage, an acousto-optic modulator (AOM) is controlled by a Pulse Pattern Generator (PPG) 015. In that case, the time of occurrence of the single photon detector's 010 output signals and the triggering signals (generated by the pulse driver 020) for the optical pulses are collected by a TDC 005 which provides timestamps of those two types of events. Those timestamps are analyzed by a data acquisition terminal connected to the TDC in order to determine the delay between laser and detection events. The OTDR trace, which is shown on the Data Acquisition Terminal 030 graphical interface, corresponds to the statistical distribution of the delay between consecutive laser and detection events. As mentioned before, a 'SE' in the case of the photon-counting OTDR can be e.g. a peak in the distribution of the delay that represents a discrete reflection in the fiber under test at a distance related to the value of this specific delay.

More generally, an SE may be detected through the processing of timestamps that are generated by a TDC. Then, a heralding signal of these SE can be generated by an event generator. In order to do so, the set-up used may be described with the following general principles:

A TDC is used to acquire the time of occurrence of events. These event times are stored as E timestamp values in one or more files.

SE may be detected by processing the E timestamp files in a programmable processing unit (e.g. a computer) connected to the TDC.

Every SE has a specific time occurrence that may be registered as a SE timestamp in a file.

This SE timestamp file is sent to a digital signal generator that generates a signal for each SE detection. This generator may arbitrarily delay this signal.

This enables to herald a SE detection with an accurate time definition (given by TDC resolution) and in a reconfigurable way (because the processing is made in programmable processing unit). Nevertheless, the file processing performed by the processing unit to analyze the E timestamp files and generate the SE timestamp file takes quite a lot of time. Therefore, it does not permit the latency between a SE detection and the corresponding heralding signal generation to be below 1 micro-second (~1 µs).

Figure 1B:
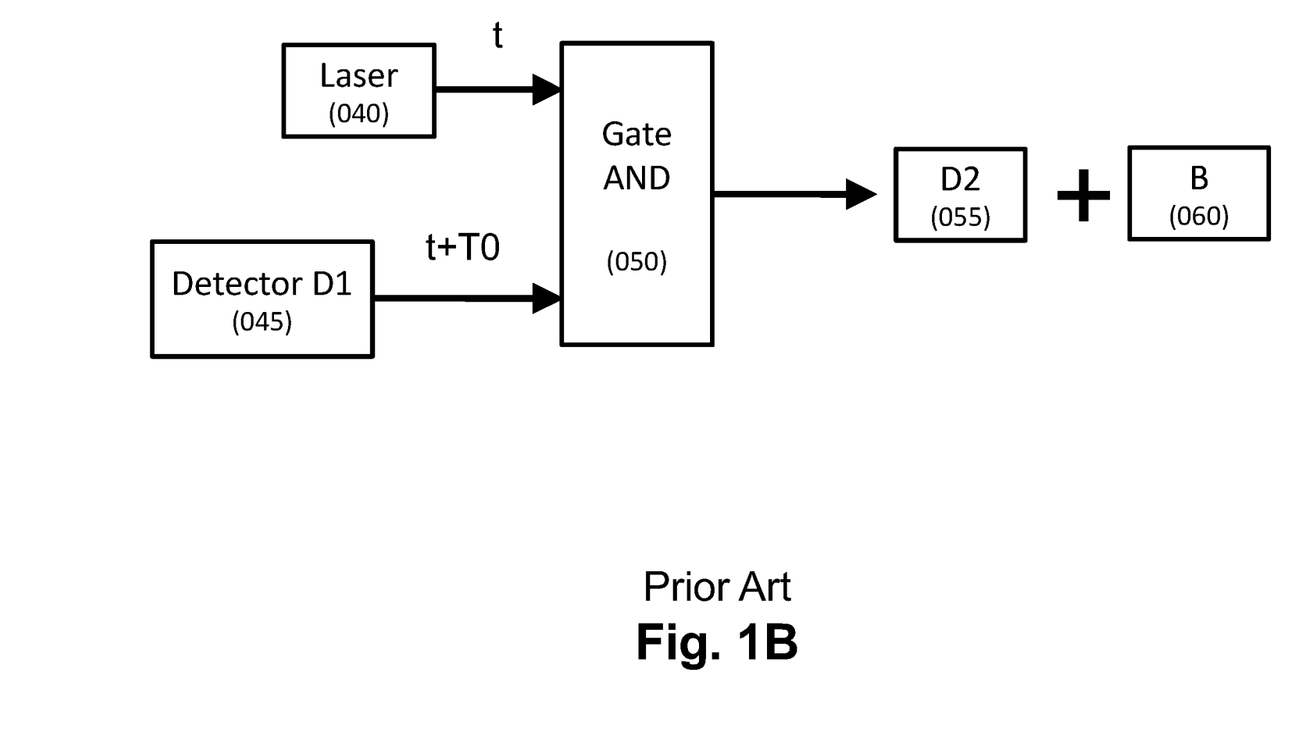
FIG. 1B is a schematic view of an example of prior art experimental set-up for a quantum optics experiment.

The second family of solutions is based on combinations of discrete electrical components (e.g. logical gates, electrical wires . . . ) used for detecting SE occurrence and heralding it. This is for example described in (Riedmatten & al., 2003) and (Marcikic & al., 2003) publications. These set-ups represented in FIG. 1b are realized to observe quantum interferences with photons coming from different sources. These articles disclose experimental realizations where:

- the E are generated by the electrical signal heralding the emission of an optical laser pulse ('laser clock') 040 or the detection of single photons by Ge-based detector 'D1' 045,
- the delay between the events generated by the laser and the ones generated by the detector 045 is adjusted with optical fibers or coaxial cables length in such a way that an event of D1 due to a photon detection reaches an AND-logical gate at the same time than the corresponding laser event. The SE is defined as both events arriving at the same time on the logical gate (which might be called a coincidence between the two events). The output signal of the AND-gate is a '1' when this SE occurs. This output signal is the signal heralding the detection of the SE.
- This heralding signal of the SE is sent to the InGaAs detectors D2 055 and B 060 for their activation. Appropriate delays might be added on the heralding signals in order to activate D2 and B at appropriate time when photons impinge on these detectors. This way to proceed allows one to reduce strongly the noise of D2 and B because they are activated only when the photons are supposed to reach them.
- Logical gates such as OR, AND, NAND, NOR or XOR which are implemented as discrete components are used to make logical operations on several events and thus enabling SE detection. These gates are often implemented with components such as diodes, transistors or inverters Note that in this case, thanks to the use of logical gates made of discrete components, the precision on the detection time of the SE is quite high and the latency of the generation of the heralding signal is pretty low. This high performance is achieved because those two parameters are limited by the discrete component bandwidth and latency. However, if you want to change the SE type (e.g. we want to change the logical operation or the delay between the events before the logical operation), you need to change the discrete components or the cable length. Therefore, this method is not reconfigurable.

The third and last family of solutions that may be use for detecting SE and generating a signal heralding this detection is based on synchronous reconfigurable solutions made with synchronous processing units like e.g. micro-processors or FPGA. The exploitation of these synchronous devices allows one to perform the acquisition of digital signals E, the detection of SE and the generation of a signal heralding this detection. All these operations are performed at the given working frequency of the used synchronous device. This approach permits one to perform reconfigurable logical operations with a low latency; nevertheless it has a temporal precision that is limited to about one period of processing unit working frequency. This means that the temporal precision of the generation heralding signal which is the result of the logical operations can not be better than the period of the synchronous device.

As it has been presented here, actually there is no solution capable to generate a heralding signal after the detection of a SE with a high temporal resolution (which is less than 100 ps), a low latency (which is less than 1 µs) and in a reconfigurable way simultaneously. This main drawback might be critical in some quantum optics experiments and other research applications.

Non-Patent Literature Includes:

De Riedmatten H., Marcikic I., Tittel W., Zbinden H., and Gisin N., (2003). Quantum interference with photon pairs created in spatially separated sources, Phys. Rev. A 67, 022301

Marcikic I., De Riedmatten H., Tittel W., Zbinden H., Gisin N. (2003). Long distance quantum teleportation of qubits from photons at 1300 nm to photons at 1550 nm wavelength. Nature 421, 509-513

Zhao Q., Xia L., Wan J., Jia, T. Gu, M., . . . Wu P. (2015). Long-haul and high-resolution optical time domain reflectometry using superconducting nanowire single-photon detectors. *Scientific Reports,* 5, 10441.

SUMMARY

A "Super Event" (SE) is defined as the occurrence of a combination of several events "E" or the result of a logical operation between several "E" that might have been arbitrarily delayed. It is the result of logical operations, including for example Boolean logic and delay introduction, between E made with an accurate timing. Up to now "SE" detection and generation of signal heralding such "SE" requires most of the time the use of multiple devices such as a TDC, a delay generator and computers which by consequence are complex implementation set-ups where interoperability and latency issues have often impacts on experiments results.

Nevertheless, SE precise detection at pico-second scale may be a critical issue in certain domains such as Quantum Optic experiments as the time resolution of a functional and programmable logic recognizing a super event is lower than a TDC time resolution.

Therefore none of the disclosed inventions, publications or commercialized products discloses a configuration capable of external events occurrence time acquisition with high accuracy, performing reconfigurable logical operations on a subset of these incoming events and generating a digital signal as an output of the device with low latency, which thereby implies a direct interoperability between the different subparts of the device. This represents a significant advantage in physics experimentations Based on this prior art it is an object of the present invention to provide an apparatus based on a combination of synchronous and asynchronous systems capable:

to detect with accurate time precision a pre-defined SEs with a pico-second resolution to time accurately generate signals heralding the SE detections in response thereto. These heralding signals are called External Super Event (ESE).

As an illustrative example, experiments where the present invention is very useful are the identification of coincidence, quantum interference or advanced single-photon OTDR.

A first aspect of the invention therefore relates to a reconfigurable and timely accurate method of generating, with a low latency, an output signal in response to multiple input signals, wherein said input signals occur at independent times, and wherein the occurrence of several input signals according to predetermined pattern is interpreted as a Super Event (SE) and wherein a detected Super Event triggers the production of a specific output signal heralding this SE, characterized in that said method comprises a first step of time acquisition of the occurrence of said input signals, a second step of adaptation of the acquisition data flow to the clock of the reconfigurable processing unit, a third step of determining the occurrence of a Super Event (SE) by comparing the events pattern to the super event definition, a fourth step identifying the Super Event and generating at least one event/signal corresponding to at least one trigger signal, a fifth step of adaptation of the generation data flow to the asynchronous generation device, a sixth step of applying a predefined delay for the issue of the at least one trigger signal, and a seventh step of outputting at least one output signal representing a trigger signal and sending it to a downstream unit.

Advantageously, the first step is carried out by a Time to Digital Converter (TDC) at a first time resolution.

Advantageously, the third and fourth steps is carried out by a programmable logic (120) at a second time resolution less precise than the first time resolution.

Advantageously, the sixth and seventh steps are carried out by a Time and Event Generation device (130) with a delays terminal at the first time resolution.

Advantageously, the method further comprises a step before the first step, defining a super event occurrence and an external super event parameters.

Advantageously, when the Super event is not identified, the method returns to the first step.

Advantageously, the adaptation of the acquisition data flow steps are carried out in time resolution modifying interfaces.

A second aspect of the invention concerns an apparatus capable of producing an output signal in response to multiple input signals, wherein said input signals occur at independent times, and wherein the occurrence of several input signals within a predetermined time slot is interpreted as a Super Event (SE) and wherein a detected Super Event triggers the production of a specific output signal, characterized in that said apparatus comprises a Time to Digital Converter, a Functional and Programmable Logic, and a Time and Event Generation unit with a delay terminal, said output signals being trigger signals for the actuation of systems external of said apparatus, via a Data Acquisition and Controlling Terminal.

Advantageously, the Time to Digital converter, said Functional and Programmable Logic and said Time and Event Generation unit are combined in a single physical device, reducing interoperability problems of prior art devices where said components are separate units.

Advantageously, the apparatus further comprises a first interface between the Time to Digital Converter and the Functional and Programmable Logic, said first interface being adapted to lower the time resolution between the Time to Digital Converter and the Functional and Programmable Logic.

Advantageously, the apparatus comprises a second interface between the Functional and Programmable Logic and the Time and Event Generation unit, said second interface being adapted to raise the time resolution between the Functional and Programmable Logic and the Time and Event Generation unit.

BRIEF DESCRIPTION OF THE DRAWINGS

Preferred embodiments of the invention are described in the following with reference to the drawings, which illustrate preferred embodiments of the invention without limiting the same. In the drawings.

DETAILED DESCRIPTION

In the following, an exemplary system and method shall be described in detail with reference to FIGS. 2 to 5. Those of ordinary skill in the art will realize that the following description is illustrative only and is not intended to be in any way limiting.

Figure 2:
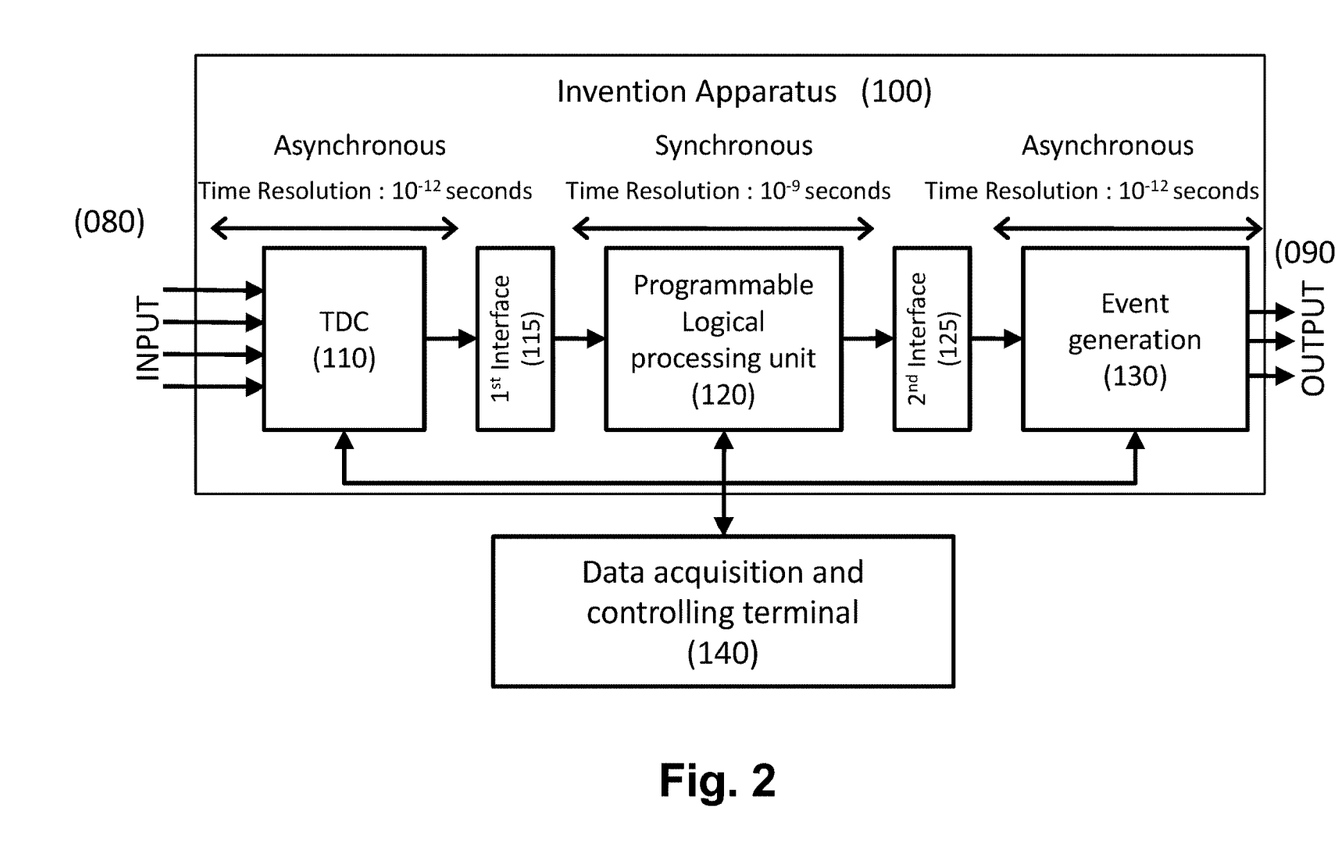
FIG. 2 is a schematic view of the apparatus functional blocks and signal flow.

FIG. 2 schematically illustrates the functional blocks of the disclosed system. According to the present invention, the apparatus 100 is composed of at least three subsystems. The first one is a TDC 110 or an equivalent system (see definition of TDC in prior art) which is capable to define the occurrence time of an event E which may be considered as a hit of a photon on a detector, for example, with the resolution of a few picoseconds. The TDC 110 has an asynchronous behavior as the time of the hit signal may be determined at any moment within an interval clock of the TDC counter with a precision higher than the period of this clock. The second subsystem is a programmable logical processing unit 120 that may be implemented in an FPGA or reconfigurable gates. A first interface 115 is positioned between the TDC 110 and programmable logical processing unit 120 in order to manage the transition between asynchronous and synchronous systems. The type of apparatus that can be used as an interface is described later. This second subsystem, the programmable logical processing unit 120 is capable to realize several operations on the events acquired by the TDC. These operations are reconfigurable by simply reprogramming the processing unit. This second functional block 120 is working at a frequency (for example 1 GHz) that provides a much lower time resolution (about 1 ns) than the one that can be provided by the TDC 110, which is typically at the level of a few picoseconds. The third functional block is an Event generation system 130 which includes a delay generation system that is capable to generate events as electrical digital signals with a defined delay. A second interface 125 is positioned between the programmable logical unit 120 and the event generation system 130. This second interface 125 allows the transition from a synchronous system with a defined clock to an asynchronous system that generates events at defined time. The last functional block is a data acquisition and controlling terminal 140 with a graphical user interface. This data acquisition and controlling terminal 140 collects E timestamps from TDC 110, collects E timestamp and enables to reconfigure the operations realized by the programmable logic 120 and finally controls the time for the ESE (External Super Event) generation with optional delay through the Event generation system 130.

The invention apparatus combines the TDC 110, the functional and programmable logic 120 and the delay generation system 130 which are interconnected through the first interface 115 and second interface 125 within the same device 100, thus enabling to lower latency and avoiding interoperability and latency issues. The TDC 110 is in charge of measuring and acquiring external events occurrences, generated by devices not included in this invention, and which constitute invention apparatus inputs 080. This TDC 110 is followed by a programmable logic 120 that has the capacity to detect SE (e.g.: coincidence), to generate an SE timestamp occurrence and generate one or more signals based on said SE (which constitute the External Super Event ESE). The last functional block 130 is capable to generate and delay digital signals which constitute the outputs 090 of the system. This compact apparatus 100 enables to have programmable and reconfigurable functions that may be modified over time through the data acquisition and controlling terminal 140.

Furthermore, the Data acquisition and controlling terminal 140 is connected to the TDC 110, the functional and Programmable Logic 120 and the time and event generation delays 130 of the apparatus according to the present invention. The data acquisition and controlling terminal 140 permits to:

Collect timestamps from the TDC 110
Reconfigure or re-program the logic operations at the Functional and Programmable logic terminal 120, and
Configure and define the ESE time occurrence through delay generation system 130

By combining these three functional blocks 110, 120 and 130 through two interfaces 115 and 125, the apparatus is able to have an operating frequency and a signal acquisition frequency that is higher than the frequency of the logic operation.

Figure 3:
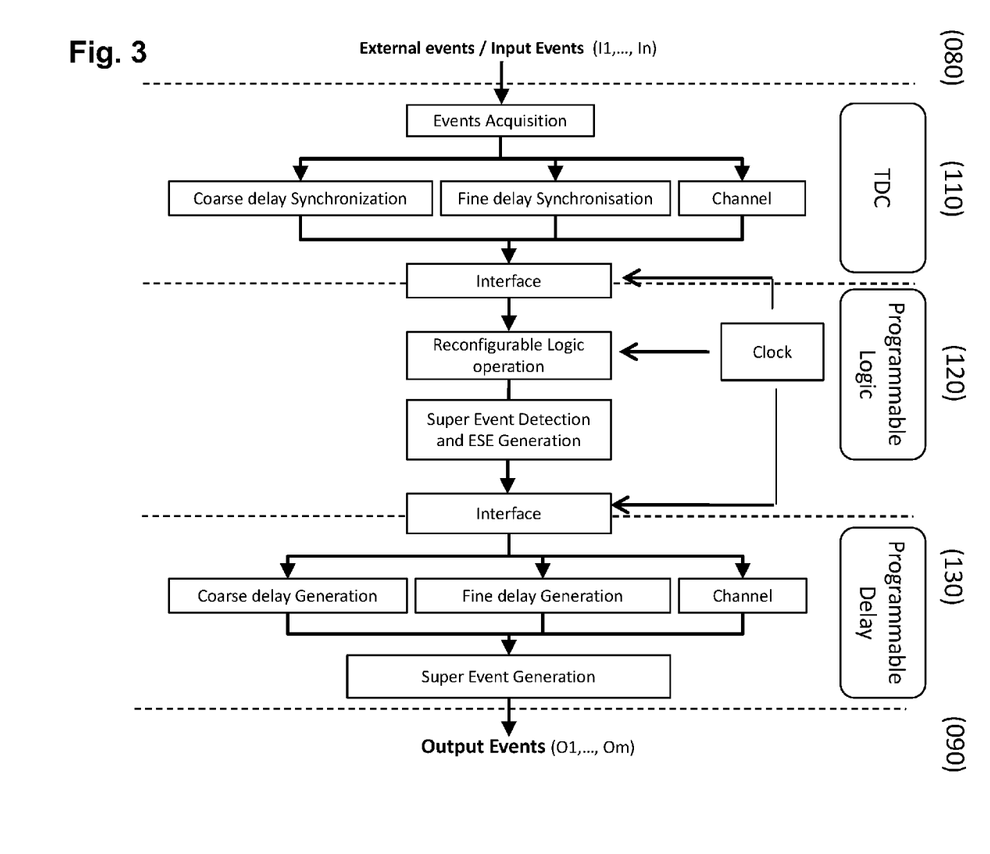
FIG. 3 is a schematic view of the detailed architecture of the apparatus of the invention at system level with its main functional blocks.

FIG. 3 illustrates the process flow of the input events 080, which are the input of the invention apparatus 100 up to the generation of the output events as the output of the invention apparatus. As a matter of fact, in the same manner as a pattern of the input events can be recognized as a (input) Super Event (SE), a pattern of output events can be recognized/named as an output external super event (ESE). It has to be understood here that the term event shall be understood as any possible cause that can be detected (such as a signal, a specific particle or a light). So it can be considered that an external super event (ESE) consists of several delayed signals generated as the output of said system 090 heralding the detection of a SE. The TDC 110 provides timestamps of Events with the Input channel occurrence of each Event. A timestamp event may be composed of Coarse and Fine delay. The events are acquired through input signals on a TDC 110 specific channel. An interface between the TDC 110 and programmable logic system 120 enables to store events in order to manage the transition between the asynchronous system 110 able to detect the events with picoseconds resolution and a synchronous system 120 capable to detect the super events based on the events detected upstream. This interface may consist in a buffer or a memory where the signal is written at TDC 110 request (i.e.: when an Event is detected) and read periodically at the programmable logic 120 clock. It is therefore possible to detect the events with a high time resolution (for example $10^{-12}$ seconds) and process the data created by these detections at a frequency adapted to processing unit 120. As an option, this read signal may be serialized in order to fasten the processing operations through a programmable logic 120 working at a lower timing resolution than the TDC 110. Non limiting examples of reconfigurable and programmable functions that may be implemented are based on Boolean logic such as OR, AND, NOR or NAND operations or arbitrary digital waveform generation. Serialized signals that are operated in parallel are then processed by the Programmable logic unit 120 in charge of generating output events (signals) based on the results of the programmable logic 120. Finally, a delay may be introduced thanks to the delay generation system 130. In order to do so, an Interface between Programmable Logic 120 and Delay Generation System 130 allows having a transition between synchronous and asynchronous systems thanks to the interfaces. In the Delay Generation System 130, events are generated at arbitrarily defined timings which compose the output events 090 and a specific channel is associated to each outputted event. Output events are then generated by the delay generation system 130. These may be represented as output trigger signals 090 or digital signal generated at one of the Invention Apparatus output channels. Each generated output event and signal will trigger and act downstream on one or more systems that follow in the experiment such as detectors, coils or lasers. The combination of all the generated external signals corresponds to the ESE (external Super Event) that can, for example consists in triggering a downstream device like a laser or starting a detector or the like. Combining programmable logic with accurate time acquisition, delay generation and dedicated interfaces adds flexibility to system acquisition and avoid system latency issues.

Figure 4:
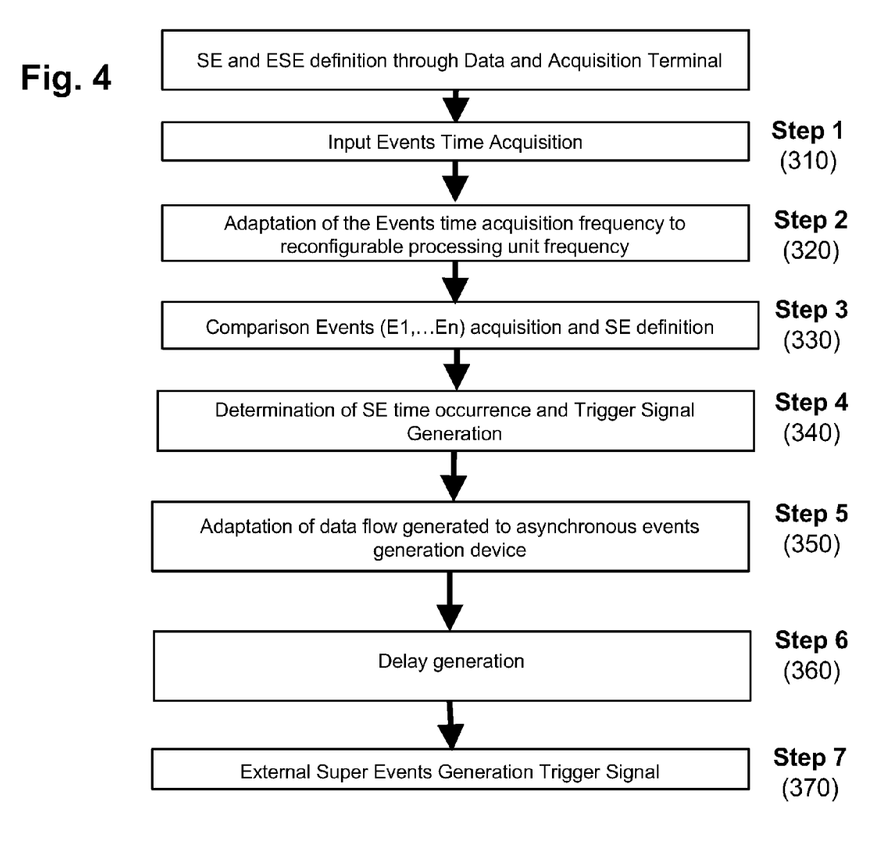
FIG. 4 is a description of the operating method associated to the apparatus of the invention.

FIG. 4 illustrates the method and steps associated to the apparatus carrying out said method.

First, a Super Event to be detected is defined, preferably by a user, through the Data acquisition and controlling terminal 140 by defining the parameters to be measured for each event E occurring on a specified Apparatus invention 100 input channel as well as the pattern of the several events. By pattern, one means timing, intensity, number, threshold, or the like. Also, an External Super Event, that has to be generated if the Super Event is identified during the experiment, is defined through the Data acquisition and controlling terminal 140. As explained previously, an External Super Event (ESE) consists of several external/output events made of signals, preferably digital signals, to be generated on a specific timing with a predefined delay (i.e. with a specific pattern) at a specific output channel.

Once the experiment is initiated, the input events occurrence time are continuously acquired in the TDC 110 according to a first step 310. Therefore the first step 310 consists in acquiring events time occurrence in an asynchronous mode for high time accuracy. This step is preferably carried out with a time resolution of about $10^{-12}$ seconds.

In a second step 320, the Events (E1, . . . , En) occurrence time acquired as data by the asynchronous TDC 110 are adapted to the clock of the Programmable logical processing unit 120 through the Interface 125 by lowering the time resolution.

In a third step 330, the acquisition of the input events (E1, . . . , En) is compared with the SE definition that has been entered beforehand. This comparison leads either to the identification or not of the super event SE in the set of pre-acquired events (E1, . . . , En). Preferably, at this moment, if the super event is not identified, then the loop is closed and the method starts again from step 1 and the newly inputted events are continuously acquired, as described in previous first step 310. If the super event is identified then the method goes to the fourth step 340 that is the determination of the SE time occurrence and the generation of at least one event/signal corresponding to at least one trigger signal. This fourth step 340 is done by logical operations carried out in the programmable logic 120 through an event and time processing. Then, the steps goes to a fifth step that raise the time resolution again to adapt the data flow generated to the downstream asynchronous event generation device. This at least one trigger signals is generated with a pre-defined timing that can be delayed in a sixth step 360 through the delay generation system 130. In a seventh and last step 370 at least one of the multiple trigger signal are generated corresponding the external super event (ESE) pattern defined beforehand and sent to downstream units to trigger, as for example activate them.

Figure 5A:
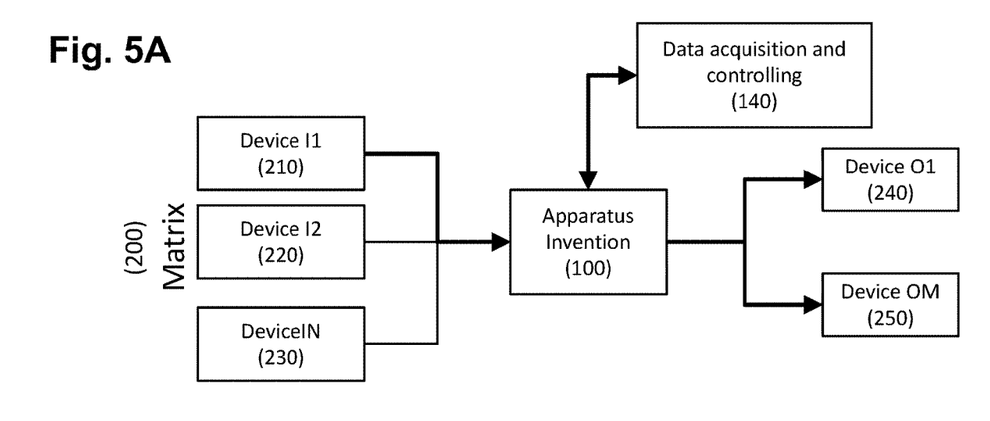
FIGS. 5A and 5B are schematic views of two experiment set-ups involving the apparatus.
Figure 5B:
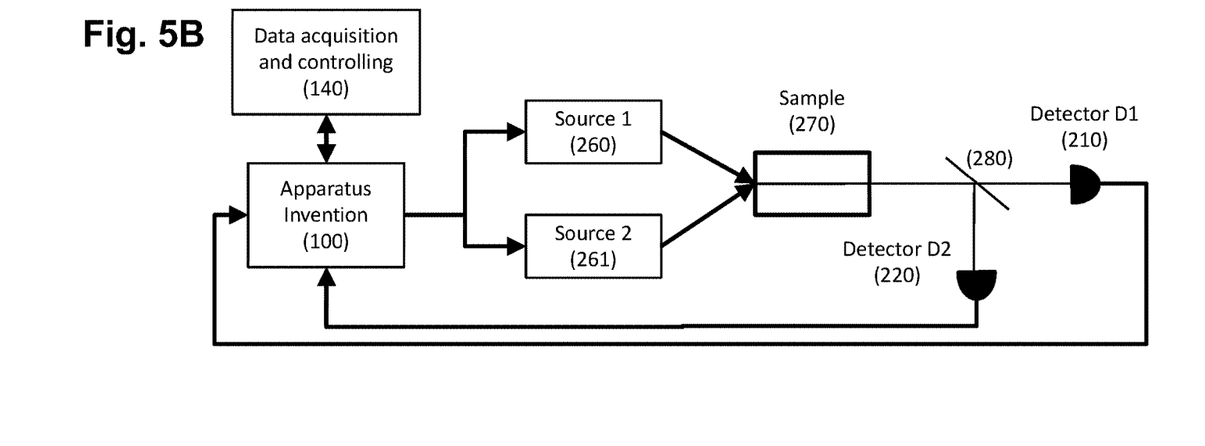

FIGS. 5a and 5b represent two experimental set-ups where the apparatus of the present invention are actually implemented.

The first experiment 5a represents the general experiment configuration where the invention apparatus 100 may be exploited. It consists of 'N' apparatuses from I1 210 to IN 230 that may be detectors for example generating events as inputs of the apparatus of the invention 100, one data acquisition and controlling unit 140, and 'M' devices (from O1 240 to OM 250) connected to the output of the invention apparatus (that may for example consist of detectors, laser and RF field generator). In the configuration presented in FIG. 5a, Devices I1, I2 to IN send input events to the apparatus of the invention 100, which triggers devices O1 240 to OM 250 depending on the operations and rules defined in the Invention Apparatus programmable logic 120 and delay generation system 130. This operations and rules are defined by the operator through the data acquisition and controlling terminal 140. This kind of set-up allows for example to actuate laser that may be represented by Device O1 240 if a pattern of events occurred at Device I1, I2 to IN.

As an example: if Device I1 210 generates an event at a given time 't1' with a resolution in the range of few picoseconds AND Device I2 220 generates an event at a given time 't2' with a resolution in the range of few picoseconds AND Device IN 230 detects an event at a given times 't3' with a certain resolution, then the device O1 240 or the device OM 250 is triggered.

The second experiment 5b aims at illustrating the exploitation of the invention apparatus in the case of one quantum optics experiment. In this specific case the experiment aims at synchronizing two photon sources 260 and 261 which may be pulsed lasers. This set-up is composed of the apparatus 100 according to the present invention comprising the above-disclosed reconfigurable time controller, at least two photon sources 260 and 261, one sample 270 which may be a non-linear crystal, one beam splitter 280 and two photon detectors 210 and 220. In this experimental set-up, the aim is to ensure that both pulses from photon sources 260 and 261 arrive at the same time in the sample which may be a non-linear crystal 270. In order to ensure the experiment realization, in a first step apparatus (100) according to the present invention comprising the above-disclosed reconfigurable time controller repetitively triggers source 1 260 and measures the arrival time at the detectors 210 and 220. Simultaneously, the apparatus (100) according to the present invention comprising the above-disclosed reconfigurable time controller repetitively triggers source 2 261 and measures the arrival time at the detectors 210 and 220. At the end of the process, the apparatus (100) according to the present invention comprising the above-disclosed reconfigurable time controller calculates the appropriate delays on Source 1 260 and Source 2 261 so that pulses overlap on the sample 270 with a picoseconds time resolution. When the overlap between pulses generated by Source 1 260 and Source 2 261 occurs at the detectors D1 210 and D2 220 then the system is stabilized.

The invention claimed is:

1. A reconfigurable and timely accurate method of generating, with a low latency, an output signal in response to multiple input signals, wherein said input signals occur at different times, and wherein an occurrence of multiple input signals according to a predetermined pattern is interpreted as a Super Event and wherein a detected Super Event triggers the production of the specific output signal heralding this Super Event, characterized in that said method comprises:
   a first step of time acquisition of the occurrence of said multiple input signals carried out by a Time to Digital Converter at a first time resolution,
   a second step of adaptation of an acquisition data flow to the clock of a reconfigurable processing unit in a first time resolution modifying interface positioned between the Time to Digital Converter and the processing unit,
   a third step of determining an occurrence of the Super Event by comparing an events pattern to a super event definition,
   a fourth step identifying the Super Event and generating at least one event/signal corresponding to at least one trigger signal,
   a fifth step of adaptation of a generation data flow to an asynchronous generation device in a second time resolution modifying interface positioned between the reconfigurable processing unit and an event generation device,
   a sixth step of applying a predefined delay for an issue of the at least one trigger signal, and
   a seventh step of outputting at least one specific output signal representing a trigger signal and sending it to a downstream unit.

2. The method of claim 1, characterized in that the first time resolution is a picosecond resolution.

3. The method of claim 1, characterized in that said third and fourth steps is carried out by a programmable logic at a second time resolution less precise than the first time resolution.

4. The method of claim 1, characterized in that said sixth and seventh steps are carried out by a Time and Event Generation device with a delays terminal at the first time resolution.

5. The method of claim 1, further comprising a step before the first step, defining a super event occurrence through Data acquisition and by defining the parameters to be measured for each event E occurring on a specified input channel.

6. The method of claim 1, wherein when the Super event is not identified, the method returns to the first step.

7. An apparatus to produce an output signal in response to multiple input signals, the apparatus comprising:
   a Time to digital Converter to acquire an occurrence of multiple input signals at a first time resolution wherein said input signals occur at independent times;

a first time resolution modifying interface positioned between the Time to Digital Converter and the processing unit adapting an acquisition data flow to the clock of a reconfigurable processing unit;

a Functional and Programmable Logic to determine an occurrence of a Super Event by comparing an events pattern to a super event definition, wherein the occurrence of several input signals within a predetermined time slot is interpreted as the Super Event;

the Functional and Programmable Logic identifying the Super Event and generating at least one event/signal corresponding to at least one trigger signal, wherein a detected Super Event triggers the production of a specific output signal;

a Time and Event Generation unit with a delay terminal to adapt a generation data flow to an asynchronous generation device in a second time resolution modifying interface positioned between a programmable logical unit and an event generation system, the Time and Event Generation unit to apply a predefined delay for an issue of the at least one trigger signal, and a Data Acquisition and Controlling Terminal to output the specific output signal representing the trigger signal and sending it to a downstream unit, wherein the output signals is a trigger signal for the actuation of a system external of said apparatus.

8. The apparatus of claim 7, characterized in that said Time to Digital converter, said Functional and Programmable Logic and said Time and Event Generation unit are combined in a single physical device.

9. The apparatus of claim 7, characterized in that it further comprises a first interface between the Time to Digital Converter and the Functional and Programmable Logic, said first interface being adapted to lower the time resolution between the Time to Digital Converter and the Functional and Programmable Logic.

10. The apparatus of claim 7, characterized in that it further comprises a second interface between the Functional and Programmable Logic and the Time and Event Generation unit, said second interface being adapted to raise the time resolution between the Functional and Programmable Logic and the Time and Event Generation unit.

* * * * *